US006360258B1

United States Patent
LeBlanc

(10) Patent No.: US 6,360,258 B1
(45) Date of Patent: Mar. 19, 2002

(54) NETWORK MANAGEMENT SOFTWARE LIBRARY ALLOWING A SENDING AND RETRIEVAL OF MULTIPLE SNMP OBJECTS

(75) Inventor: Michael R. LeBlanc, Shirley, MA (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/143,194

(22) Filed: Aug. 31, 1998

(51) Int. Cl.[7] .............................................. G06F 15/173
(52) U.S. Cl. ..................... 709/223; 709/302; 709/228
(58) Field of Search ............................... 709/217, 219, 709/223, 302, 228

(56) References Cited

U.S. PATENT DOCUMENTS 5,960,176 A * 9/1999 Kuroki et al. ............... 709/223
5,999,179 A * 12/1999 Kekic et al. ................ 345/349
6,163,802 A * 12/2000 Lin et al. .................... 709/217

OTHER PUBLICATIONS

Nakamura et al., "CMIP to SNMP Translation Technique Based On Rule Description", IEEE, Jul. 1995.*

* cited by examiner

Primary Examiner—Ayaz Sheikh
Assistant Examiner—Philip B. Tran
(74) Attorney, Agent, or Firm—McGlew and Tuttle, P.C.

(57) ABSTRACT

A method is provided for providing multiple variable retrievals and setting within one SnmpRequest. The method forms packet data units with object identifiers (OIDs). The OIDs are packet specific for a particular request in an object management system using SNMP (simple network management protocol) attributes, the object management system including a plurality of objects and procedures for accessing the objects. The object management system is accessible over a network and associated with a network-attached device. The method includes providing the object management system with a plurality of classes providing descriptions of things that can be accessed. A SnmpSessions class establishing connection between the object management system and connected devices is also provided. Call back arguments are received at the network management station from the device. A SNMP application programmer interface (API) provides elements needed for connection. A SnmpRequest class is extended for extending the API to allow a plurality of objects to be sent or requested in a single packet data unit (PDU). The SNMP packet data unit (PDU) is formed comprised of one or more object identifiers (OIDs), the OIDs being packet specific for a particular request.

A software JAVA based SNMP library system is also provided for use with a manager and connected devices. The system includes a plurality of classes providing descriptions of things that can be accessed. A SNMP application programmer interface (API) providing elements needed for connection is also provided. The system provides call-back arguments to be received at the manager from the devices. A SNMP packet data unit (PDU) comprised of one or more object identifiers (OIDs) is provided. The OIDs are packet specific for a particular request. The SnmpRequest class is provided for extending the API to allow a plurality of objects to be sent or requested in a PDU.

20 Claims, 3 Drawing Sheets

Class com.coms.S2.ISDSnmp.SnmpSession java.lang.Object ~~ 310
  |
  +----java.lang.Thread ~~ 300
        |
        +----Snmp.SnmpSession ~~ 150
              |
              +----com.coms.S2.ISDSnmp.SnmpSession ~~ 50

FIG. 3

Class com.coms.S2.ISDSnmp.SnmpRequest java.lang.Object ~~ 310
  |
  +----com.coms.S2.ISDSnmp.SnmpRequest ~~ 10

FIG. 4

Class com.coms.S2.ISDSnmp.SnmpAgent java.lang.Object
  |
  +----com.coms.S2.ISDSnmp.SnmpAgent ~~ 20

FIG. 5

NETWORK MANAGEMENT SOFTWARE LIBRARY ALLOWING A SENDING AND RETRIEVAL OF MULTIPLE SNMP OBJECTS

FIELD OF THE INVENTION

The present invention relates to a JAVA based simple network management protocol (SNMP) library (application programmer interface (API)) which is most preferably written fully in the JAVA software language. Such a library is useful for creating network management applications that can manage SNMP enabled devices. Such a system can be used to create JAVA based SNMP agents wherein the library takes care of all the SNMP details underneath whereby the user primarily focuses on the logic of the particular application.

BACKGROUND OF THE INVENTION

Managing and monitoring connected devices is quite important, both for local area network applications and other interconnected environments. Several protocols are known which are designed to enable network management of network attached devices. These protocols often include a collection of objects and procedures for accessing the objects associated with a network attached device. Simple network management protocol (SNMP) is an example of a relatively well known protocol for managing and monitoring network devices.

Under SNMP, a network device has an object management system which includes an object database containing various objects relating to the network device, referred to as a management information base (MIB) and agent software for querying and modifying the objects, referred to as an agent. A system being managed under SNMP also includes a management station running manager software which provides centralized control of the various network devices by communicating with the agent software over the network. The software for management typically runs on a network attached computer and an interface is provided in the form of a graphical user interface. The management software obtains information about the objects in the MIBs of the various network attached devices and allows a user to monitor, query or modify the objects in the MIBs. To monitor, query or modify an object the manager software sends a request over the network to the object management system. Agent software for examining or otherwise performing operations on the object examines the request, and if valid, carries out the request and sends a message back to the manager software. If an agent determines that a request is invalid, for example the request is to write to an object which can only be read, the agent returns the message indicating an error.

In SNMP, the managers software typically obtains information about each network attached device's object management system via a MIB output file. A MIB compiler generates the MIB output file from one or more MIB input files, each of which contains the name of each object in a MIB structure, and the plurality of attributes which describe the objects and the valid operations which can be performed on the objects. The MIB input file reflects the objects and attributes associated with the objects as they were intended to be implemented in the management system. The MIB compiler merges the one or more MIB input files and generates a MIB output file which contains the name of each object in the MIB and the plurality of attributes which describe the objects and the valid operations which can be performed on the objects.

A software product available from Advent Net provides an SNMP package which is an API or a library written fully in the JAVA software language. This helps a user create network management applications that can manage SNMP enabled devices. It can also be used to create JAVA based SNMP agents. The Advent Net SNMP package provides a library that is to take care of the SNMP details and provide a graphical interface such that the user can concentrate on the logic of the particular application.

Advent Net also provides a product Advent Net agent builder which is a tool for creating SNMP MIBs and instrumenting agents for the MIBs. The agent builder product provides what can be viewed as a SNMP to any gateway where the any stands for any back-end protocol. The back-end protocol could include for example file read and write operations, performing system commands, executing JAVA code and proxying to other SNMP agents.

The agent builder provides a graphical way to build SNMP agents. To each variable OID (object identifier) in the SNMP MIB, it is possible to associate an "action" when a get or set operation is performed. The action may be to read or write a file, execute a system command, run JAVA code, or proxy the SNMP operation to some other agent. This is all defined graphically by choosing from a menu. The action is stored in the MIB file itself. The agent run time reads the MIB file and starts performing according to the actions that were defined at build-time.

The Advent Network Management, Inc. products currently provide the JAVA based SNMP library as noted above. However, this library is limited in functionality in that only single object identifiers (OIDs) can be retrieved and set via one SnmpRequest. This provides only limited capabilities. Unfortunately, the limits of the Advent library require a tremendous increase in network traffic to properly manage a network.

SUMMARY AND OBJECTS OF THE INVENTION

It is an object of the invention to provide an additional software library that allows the retrieval and setting of multiple SNMP variables in one request.

It is a further object of the invention to use the Advent SNMP library as a base and to provide further functionality, namely allowing the retrieval and setting of multiple SNMP variables in one request.

According to the invention, the problem of multiple variable retrievals and setting within one SnmpRequest has been solved.

According to the invention, a process or method is provided for providing multiple variable retrievals and setting within one SnmpRequest. The method forms packet data units with object identifiers (OIDs). The OIDs are packet specific for a particular request in an object management system using SNMP (simple network management protocol) attributes, the object management system including a plurality of objects and procedures for accessing the objects. The object management system is accessible over a network and associated with a network-attached device. The method includes providing the object management system with a plurality of classes providing descriptions of things that can be accessed. A SnmpSessions class establishing connection between the object management system and connected devices is also provided. Call back arguments are received at the network management station from the device. A SNMP application programmer interface (API) provides elements needed for connection. A SnmpRequest class is extended for extending the API to allow a plurality of objects to be sent or requested in a single packet data unit (PDU). The SNMP packet data unit (PDU) is formed comprised of one or more object identifiers (OIDs), the OIDs being packet specific for a particular request.

The process includes providing the Advent SNMP library as a base. The SnmpRequest Class is extended and the Advent SNMP.SNMP Client Class is implemented within the extended SnmpRequest Class. The authenticate (SNMP PDU, string) Advent SNMP client method is implemented. This method is used to validate the user authentication with an agent. The call-back (SnmpSession, SNMP PDU, Int) Advent SNMP client method is implemented. This is the method that will handle the response received. This method also handles cases of failures or miscommunications with an agent. The debug print (string) Advent client method is also implemented. This method is used to debug messages for the developer or enduser.

Within the extended SnmpRequest Class, the method of the invention provides following a sequence of steps to utilize the SnmpRequest Class. First the application programmer interface (API) (the library) is initialized by calling the INITAPI ( . . . ) method. The argument passed into this method is a reference to this class (e.g. the "this" pointer is handed-in as the argument).

Next, after calling the INITAPI ( . . . ) method, the packet data unit (PDU) is initialized by calling the INITPDU ( ) method. This method does not require any argument.

Next an SNMP agent object is instantiated (created). This is accomplished by handing in the agent name, internet protocol (IP) address, and a community string to the SNMP agent constructor (namely the agent builder referred to in the introduction). It should be noted that the SNMP agent can be created at several points within the construction of the extended SnmpRequest Class but it must be completed before the next call to INIT session ( ). Next, the INIT session ( ) method should be called. This will allow communications between the network management station and the end device.

Once the above steps are complete, one can then create object identifier (OID) variables to send to the device. To accomplish this the AddVar methods are used to add one (1) or more variables to the PDU. Once the variables are added the packet data unit is sent to the device using the "GET ( )" "GETNEXT ( )" or "SET ( )" methods (depending upon the request type). When the packet returns or the system detects a communication failure, the "call-back" method noted above would be called by the system and as noted above, the end user is responsible for how the response is handled.

According to another aspect of the invention, a software JAVA based SNMP library system is provided for use with a manager and connected devices. The system includes a plurality of classes providing descriptions of things that can be accessed. A SNMP application programmer interface (API) providing elements needed for connection is also provided. The system provides call-back arguments to be received at the manager from the devices. A SNMP packet data unit (PDU) comprised of one or more object identifiers (OIDs) is provided. The OIDs are packet specific for a particular request. The SnmpRequest class is provided for extending the API to allow a plurality of objects to be sent or requested in a PDU.

The system and method of the invention are based on the Advent SNMP library as a base and use this library. The Advent system is based on requesting one object identifier (OID) with the SnmpSession class with the GET function (for example to get information), the SET function (to set a certain attribute) and the GETNEXT function (to get information that is the next attribute associated with the referred to attribute). The system of the invention provides that the SnmpRequest Class implements the SnmpSession class and is associated with an SnmpSession Class. The SnmpSession Class is the device that will be communicated with for a request. The SnmpSession Class of the invention inherits (assumes the associated information) from the SnmpSession Class of the Advent system but also has a specialized extension which will be discussed further below.

The SnmpRequest Class of the invention provides GET, SET and GETNEXT functions as discussed above. However, the extension of the SnmpRequest Class extends the Advent library to provide GET and SET functions for one or more OIDs, thereby providing multiple variable retrievals and setting within one SnmpRequest. As this enhanced API (library) allows many objects to be sent or requested within the same PDU, network traffic is reduced considerably. As an example, a table of information may require 50 requests using the basic Advent package but the library according to the invention allows those 50 requests to be sent in one request thus reducing the network traffic. The SNMP library of the invention is implemented such that it is extensible and can be used as necessary by various different companies.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 3 is a diagram showing the association of the SnmpSession class with respect to the SnmpSession class and associated JAVA.LANG.THREAD (JAVA language thread) in JAVA.LANG.OBJECT (JAVA language object);

FIG. 4 is a diagram showing the association of the SnmpRequest class with respect to the JAVA.LANG.OBJECT (JAVA language object); and FIG. 5 is a diagram showing the association of the SnmpAgent class with respect to the associated JAVA.LANG.THREAD (JAVA language thread) in JAVA.LANG.OBJECT (JAVA language object).

DESCRIPTION OF THE PREFERRED EMBODIMENT

Figure 1:
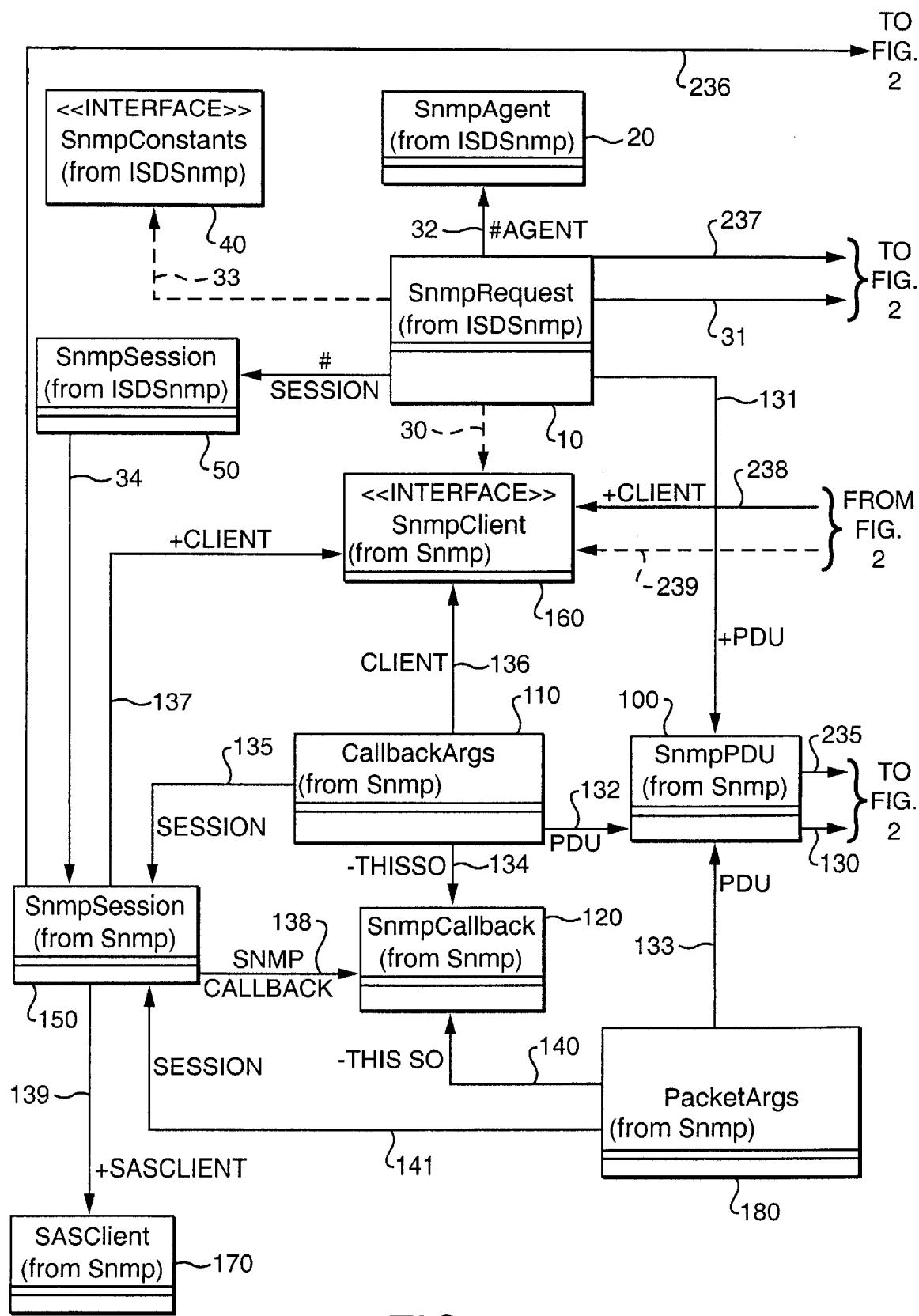
FIG. 1 is a diagram showing classes for use with the Advent SNMP library as a base as well as Advent SNMP library classes.

Referring to the drawings in particular, the invention comprises a system and method for allowing many objects to be sent or requested within the same packet data unit, thus allowing network traffic to be considerably reduced. The library provided according to the invention uses the Advent SNMP library as a base but allows the sending and retrieval of multiple SNMP objects within the same SNMP request.

Figure 2:
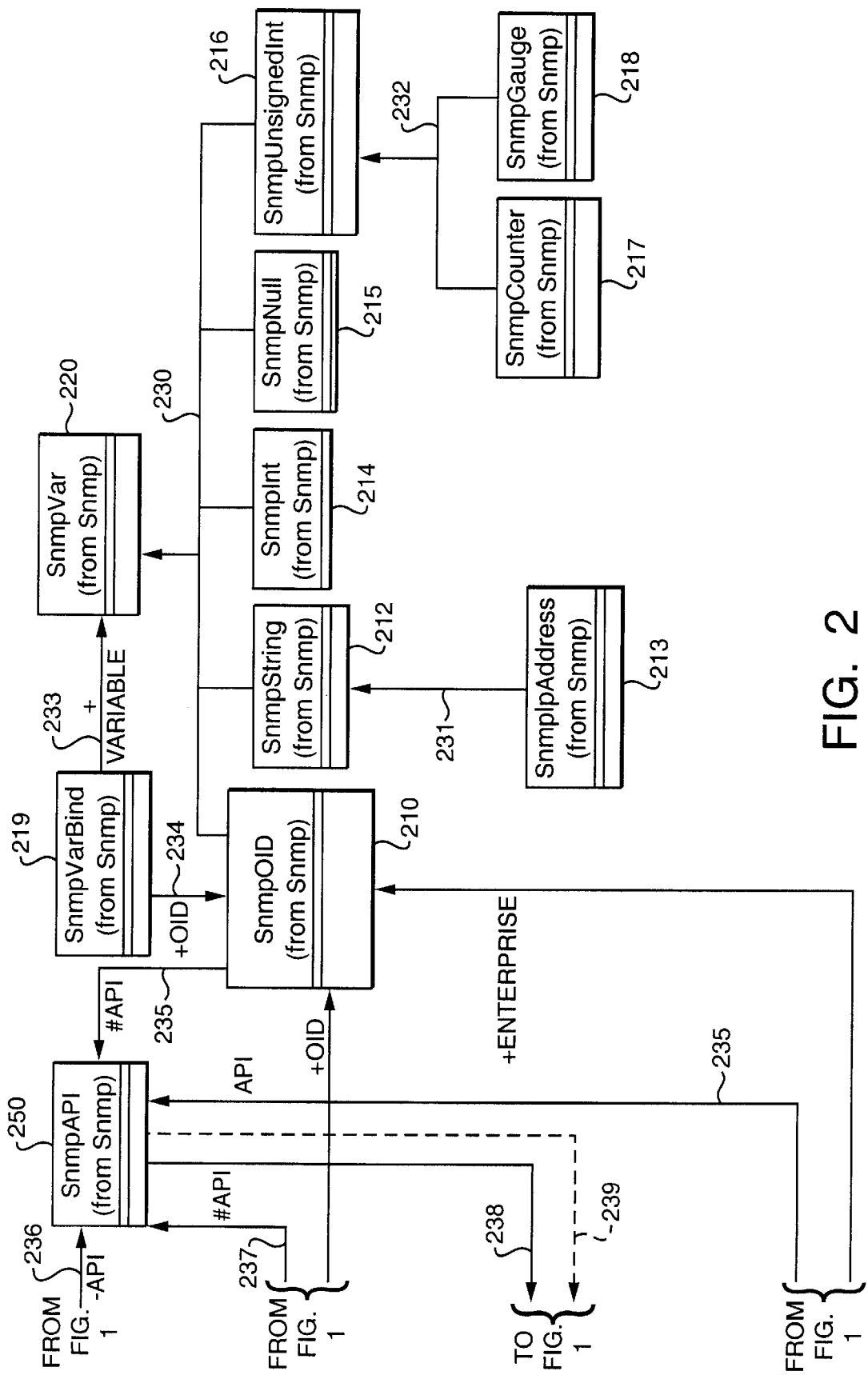
FIG. 2 is a diagram showing the Snmp API class and other classes (providing descriptions of things that can be accessed) all of which are directly or indirectly associated with the classes of FIG. 1.

FIGS. 1 and 2 together form a diagram of the software system of the invention. The various boxes represent classes including Advent SNMP library classes as well as classes added to form the system of the invention. The solid lines connecting classes with closed triangle arrow indicate that the pointed to class is inherited by the connected class. The dash line connecting classes with closed triangle arrow indicate the pointed to class is implemented by the connected class. The solid lines connecting classes with open end arrow indicates an association between classes where the connected class is aware of (has knowledge of) the connected class.

The system of the invention provides a SnmpRequest Class designated 10 which is shown in FIG. 1. The SnmpRequest Class provides GET, SET and GETNEXT functions. The SnmpRequest Class 10 of the invention extends the Advent library to provide GET and SET for one or more object identifier (OID).

The various classes of FIGS. 1 and 2 can contain information such as specialized structures, tags to make information private such as access methods or can include routines that only certain parts can modify. The special classes used in the system are detailed below including the various constructors, methods, variables. The components of the Advent SNMP library are known themselves (The ADVENTNET SNMP PACKAGE VERSION 1.3 Documentation at site http://www.adventnet.com/products/snmpv1/help/index.html is hereby incorporated by reference).

In FIG. 2 the class SnmpOID 210 is shown as inheriting class SnmpVar 220 at 230. This is shown as a tree type link 230 between the various classes. The SnmpString class 212 also inherits class SnmpVar 220 at 230. The associated specialized string, SnmpIpAddress string 213, inherits SnmpString class 212 at 231. The classes SnmpInt 214, SnmpNull 215 and SnmpUnsignedInt 216 also inherit class SnmpVar 220 at 230. The classes SnmpCounter 217 and SnmpGauge 218 are shown inheriting SnmpUnsignedInt 216 at 232. SnmpVarBind 219 is shown as having SnmpVar 220 associated with it at 233 and having SnmpOID 210 associated with it at 234. The classes 212–218 are the description of the things that can be accessed through the system. These classes provide a way to categorize the data. They also provide methods to extract information about the various data types into a particular format.

The SnmpAPI 250 is an API or library, particularly that API class offered with the Advent Net SNMP package. SnmpAPI 250 helps create network management applications that can manage SNMP enabled devices and can also be used to create JAVA based SNMP agents. The agent takes care of the SNMP details. The SnmpAPI is created and then it is told which are the ports of the various devices. The SNMP is required for making connections such as requests to devices and get reports back from devices. At startup the SNMP is advised of the ports that the system is using and includes instructions such as if talking, waiting a certain number of milliseconds for further action.

The SnmpAPI 250 is associated with SnmpOID 210 as shown at 235. The SnmpAPI 250 is associated with a SnmpPDU class 100 as shown at 235. The SnmpAPI 250 is associated with a SnmpSession class 150 as shown at 235. The SnmpAPI 250 is associated with the SnmpRequest class 10 as shown at 235. Ah Interface SnmpClient class 160 is associated with the SnmpAPI 250 as shown at 238. The SnmpAPI 250 also implements the Interface SnmpClient class 160 as shown at 239.

The SNMP PDU 100 is the packet which is specific for particular requests. One or more object identifiers (OIDs) makeup a PDU. This can include specific information, name, address, telephone number, etc. The system of the invention sends a PDU to a device based on a request. As noted, the SnmpAPI 250 is associated with the SnmpPDU class 100 as shown at 235. The SnmpOID class 210 is associated with the SnmpPDU class 100 as shown at 130. The SnmpPDU class 100 is associated with SnmpRequest class 10 as shown at 131. The SnmpPDU class 100 is associated with CallbackArgs class 110 as shown at 132. The SnmpPDU class 100 is associated with PacketArgs class 180 as shown at 133.

The SnmpCallback class 120 is associated with the CallbackArgs class 110 as shown at 134. The SnmpSessions Class 150 is associated with the CallbackArgs class 110 as shown at 135. The interface SnmpClient 160 is also associated with the CallbackArgs class 110 as shown at 136.

The interface SnmpClient 160 is associated with the SnmpSessions Class 150 as shown at 137. The SnmpCallback class 120 is associated with the SnmpSessions Class 150 as shown at 138. The interface SnmpClient 160 is associated with SASClient class 170 as shown at 139.

The SnmpCallback class 120 and the SnmpSessions Class 150 are each associated with the PacketArgs class 180 as shown at 140 and 141 respectively.

The Callbacks 110 and 120 are called upon the receipt of a response at the network management station (manager) from a device. The SnmpSessions class 150 and associated SASClient class 170 establish the connection to the particular device based on the IP (internet protocol) and the community string.

The system uses the library 250 to go into the device and request one or more object identifiers with a Get, Set or GetNext method. The Get method gets information from a device, the Set method sets an attribute of the device and the GetNext method gets the next attributed associated with the identified information. These methods are associated with the SnmpSessions class 150.

The invention extends the SnmpRequest class 10 and implements the Advent SNMP SnmpClient class 160 within the extended class as shown at 30. The SnmpAPI 250 is associated with the SnmpRequest class 10 (at 237) and the SnmpPDU 100 is also associated with the SnmpRequest class 10 (at 131). The SnmpOID 210 is also associated with the SnmpRequest class 10 as shown at 31. An SnmpAgent class 20 is provided by the invention as detailed below. The SnmpAgent class 20 is associated with the SnmpRequest class 10 as shown at 32. An Interface SnmpConstants class 40 is implemented within SnmpRequest class 10 as shown at 33.

A further SnmpSession Class 50 is provided. The SnmpSession Class 50 of the invention inherits (assumes the associated information) from the SnmpSession Class 150 of the Advent system but also has a specialized extension which will be discussed further below. The SnmpSession Class 50 is associated with the SnmpRequest class 10 as shown at 34.

The SnmpRequest class 10 is associated with the SnmpSession class 20 which inherits the SnmpSession class 250 by the association represented as 120. The SnmpRequest class 10 is also associated with the SNMP agent 30. The interface SNMP constants class 40 is implemented within the SnmpRequest class 10 as indicated by the dash line. For example the interface SNMP client 260 is implemented within the SnmpAPI 350 as indicated by the dash line. The other various interconnections of classes indicate associations and particularly the inheritance of information associated with one class by the connected class (as described with regard to SnmpOID 310.

FIG. 3 shows the association of the SnmpSession class 50 with respect to the SnmpSession class 150 and associated JAVA.LANG.THREAD (JAVA language thread) 300 in JAVA.LANG.OBJECT (JAVA language object) 310. The public class SnmpSession( ) 50 extends the SnmpSession 150. The components include:
Constructor Index
SnmpSession (SnmpAPI) this is a constructor.
Method Index
run( ) this method should be called when running in a netscape browser.
Constructors
SnmpSession
  public SnmpSession (SnmpAPI api)
    This is the constructor.
  Parameters: api-the Snmp.SnmpAPI for this session.
Methods
run
  public void run ( )
    this method should be called when running in a netscape browser. It provides a work around for security issues within netscape.
  Overrides:
    run in class SnmpSession.

FIG. 4 shows the association of the SnmpRequest class 10 with respect to the JAVA.LANG.OBJECT (JAVA language object) 310. Public class SnmpREQUEST extends the Object, implements SnmpClient and SnmpConstants. The components include:
Variable Index
agent The SNMP agent (device) for this device
api The SnmpAPI for this request.
applet The applet associated with this request (if any)
DEBUG_LEVEL The debug level for this request.
doomed Whether this request should be destroyed or not.
m_Retries The retry parameter for this request.
m_Timeout The timeout parameter (in milliseconds) for this request.
m_useNetscapeAPI Whether we are functioning in a Netscape browser or not.
oid The SnmpOID for this request.
pdu The packet data unit (PDU) for this request.
pduErrString An array of error strings
reqid The SnmpRequest ID sent
reguestsList A list containing all the requests sent via this object
session The session (device) that will be communicated with for this request.
Constructor Index
SnmpRequest( ) This is the default constructor.
SnmpRequest(SnmpAgent) This is a constructor for a stand alone based application
SnmpRequest(SnmpAgent, Applet) This is a constructor for a client (browser) based applet
SnmpRequest(SnmpAgent, Applet, int) This is a constructor for a client (browser) based applet
SnmpRequest(SnmpAgent, int) This is a constructor for a standalone based application
Method Index
addVar(String[ ]This method adds one or more variables to the SnmpPDU.
addVar(String[ ], String[ ], int[ ]) This method adds 1 or more variables and 1 or more associated values to the SnmpPDU and sets 1 or more associated types of request.
apiStop( ) This method shutsdown the SnmpAPI.
authenticate(SnmpPDU, String) This debug print method is not currently used.
callback(SnmpSession, SnmpPDU, int) This method should be implemented by the user in the extended class.
cleanup( ) This cleanup method should be called periodically from a thread. Deprecated.
commitSnmpChanges( ) Commits the communication parameters for the session Deprecated.
debugPrint(String) This debug print method is not currently used.
exportMessage(String, int) Export user messages to a com.coms.S2.ISDUtils.SDLogger if available or to System.err.println otherwise.
get( ) This method provides asynchronous communications (non-blocking) to retrieve information from a device.
get(boolean) This method provides synchronous communications (blocking) to retrieve information from a device.
getNext( ) This method provides asynchronous communications (non-blocking) to retrieve information from a device.
initApi(SnmpClient) Initializes the SnmpAPI for this request
initPDU( ) Initializes the SnmpPDU for this request This method should be used when using the same SnmpRequest to make multiple requests
initRequest(SnmpAgent, Applet, int) Initializes the SnmpAgent, Applet and debug level of the request.
initSession( ) Initializes the SnmpSession parameters.
initSnmp( ) Initializes the SnmpRequest parameters.
isInSubTree(SnmpPDU, SnmpPDU) Check if first varbind oid has a root object identifier (OID) as an ancestor
sendPDU( ) Sends a PDU synchronously (blocking) to a device.
sendPDU(SnmpPDU) Sends a PDU asynchronously (non-blocking) to a device.
sessionStart( ) This method provides a workaround for security issues for the Netscape browser.
sessionStop( ) This method shutsdown the SnmpSession.
set( ) This method provides asynchronous communications (non-blocking) to set information on a device.
set(boolean) This method provides synchronous communications (blocking) to set information on a device.
setLogger(SDLogger) This method hooks the com.coms.S2.ISDUtils.SDLogger into the SnmpRequest
setSessionCommunity(String, String) Set the community string of the agent
setSessionPeername(String) Set the agent to communicate with
setSessionRetries(int) Set the number of retries to communicate with a device
setSessionTimeout(int) Set the amount of time to wait for a response from a device.
setSnmpApiName(String) This method sets the SnmpAPI name
setSnmpSessionName(String) This method sets the SnmpSession name
useNetscapeAPI(boolean) This method provides a workaround for security issues for the Netscape browser.
Variables
session
  protected SnmpSession session
    The session (device) that will be communicated with for this request.
api
  protected SnmpAPI api
    The SnmpAPI for this request.

m_Timeout
  protected int m_Timeout
    The timeout parameter (in milliseconds) for this request.
m_Retries
  protected int m_Retries
    The retry parameter for this request.
DEBUG_LEVEL
  protected int DEBUG_LEVEL
    The debug level for this request. The level can range from 0 to 3. A level of 0 provides no debug information and a level of 3 provides all the debug information available. Default is 0.
m_useNetscapeAPI
  protected boolean m_useNetscapeAPI
    Whether functioning in a Netscape browser or not.
doomed
  protected boolean doomed
    Whether this request should be destroyed or not.
agent
  protected SnmpAgent agent
    The SNMP agent (device) for this device.
applet
  protected Applet applet
    The applet associated with this request (if any)
pdu
  public SnmpPDU pdu
    The packet data unit (PDU for this request)
oid
  public SnmpOID oid
    The SNMP OID for this request.
reqid
  public int reqid
    The SnmpRequest ID sent.
requestsList
  protected static Vector requestsList
    A list containing all the requests sent via this object.
pduErrString
  public static final String pduErrString[ ]
    An array of error strings.
Constructors:
SnmpRequest
  public SnmpRequest( )
    This is the default constructor. The user MUST set the SnmpAgent by calling the initRequest method
SnmpRequest
  public SnmpRequest(SnmpAgent agent)
    This is a constructor for a standalone based application.
    Parameters:
      agent—the SnmpAgent to communicate with
SnmpRequest
  public SnmpRequest(SnmpAgent agent, int DEBUG_LEVEL)
    This is a constructor for a standalone based application.
    Parameters:
      agent—the SnmpAgent to communicate with
      DEBUG_LEVEL—the level of debug information desired. The level can range from 0 to 3. A level of 0 provides no debug information and a level of 3 provides all the debug information available. Default is 0.
SnmpRequest:
  public SnmpRequest(SnmpAgent agent, Applet applet)
    This is a constructor for a client (browser) based applet.
    Parameters:
      agent—the SnmpAgent to communicate with
      applet—the Applet associated with this request
SnmpRequest
  public SnmpRequest(SnmpAgent agent, Applet applet, int DEBUG_LEVEL)
    This is a constructor for a client (browser) based applet.
    Parameters:
      agent—the SnmpAgent to communicate with
      applet—the Applet associated with this request
      DEBUG_LEVEL—the level of debug information desired. The level can range from 0 to 3. A level of 0 provides no debug information and a level of 3 provides all the debug information available. Default is 0.
Methods
initRequest:
  public void initRequest(SnmpAgent agent, Applet applet, int DEBUG_LEVEL) Initializes the SnmpAgent, Applet and debug level of the request. The Applet parameter may be null and the DEBUG_LEVEL parameter may be 0. This method is used with the default constructor SnmpRequest( ) which does not use arguments.
  Parameters:
    agent—the SnmpAgent to communicate with
    applet—the Applet associated with this request
    DEBUG_LEVEL—the level of debug information desired. The level can range from 0 to 3. A level of 0 provides no debug information and a level of 3 provides all the debug information available. Default is 0.
initApi
  public void initApi(SnmpClient client)
    Initializes the SnmpAPI for this request
    Parameters:
      client—the SnmpClient that will handle the SNMP communications
initSnmp
  public void initSnmp( )
    Initializes the SnmpRequest parameters. This method cleans up previous communications, initializes the SnmpAPI, handles the diagnostics, initializes the SnmpPDU, prints out the SnmpAgent information to the screen and initializes the SnmpSession.
initSession
  protected void initSession( )
    Initializes the SnmpSession parameters. This method uses the parameters set in for the SnmpAPI, SnmpAgent and Applet to establish communications with a remote device
initPDU
  public boolean initPDU( )
    Initializes the SnmpPDU for this request This method should be used when using the same SnmpRequest to make multiple requests Returns:
    The boolean value indicating if the PDU was created properly.
cleanup
  public void cleanup( )
    Note: cleanup( ) is deprecated. This method is no longer required.
    This cleanup method should be called periodically from a thread.
isInSubTree
  protected boolean isInSubTree(SnmpPDU origPdu, SnmpPDU curPdu) Check if first varbind oid has a root object identifier (OID) as an ancestor Parameters:
    origPdu—The original SnmpPDU sent in the getNext sequence
    curPdu—The current SnmpPDU of the getNext sequence Returns:
    the boolean value indicating whether this variable is part of the same tree setSessionTimeout
    public boolean setSessionTimeout(int timeout)
    Set the amount of time to wait for a response from a device.
    Parameters:
        timeout—The timeout length in milliseconds
    Returns:
        the boolean value indicating whether this was successful setSessionRetries
    public boolean setSessionRetries(int retries)
    Set the number of retries to communicate with a device.
    Parameters:
        retries—The number of times to attempt to communicate with a device.
    Returns:
        the boolean value indicating whether this was successful setSessionPeername
    public boolean setSessionPeername(String name)
    Set the agent to communicate with.
    Parameters:
        name—The name of the device to communicate with (the IP address of the device).
    Returns:
        the boolean value indicating whether this was successful setSessionCommunity
    public boolean setSessionCommunity(String read Community, String write Community)
    Set the community string of the agent.
    Parameters:
        read Community—The read community string of the agent.
        writeCommunity—The write community string of the agent.
    Returns:
        the boolean value indicating whether this was successful commitSnmpChanges
    public void commitSnmpChanges( )
    Note: commitSnmpChanges( ) is deprecated. This method is no longer used.
    Commits the communication parameters for the session.

get
    public int get( )
    This method provides asynchronous communications (non-blocking) to retrieve information from a device. The user should load the SnmpPDU with 1 or more parameters before calling this method. This method will make one request for 1 or more objects.
    Returns:
        the int request ID
    See Also:
        addVar, addVar, addVar getNext
    public int getNext( )
    This method provides asynchronous communications (non-blocking) to retrieve information from a device. The user should load the SnmpPDU with 1 or more parameters before calling this method. This method will make one request for the next 1 or more objects in a MIB tree (if any).
    Returns:
        the int request ID
    See Also:
        addVar, addVar, addVar get
    public SnmpPDU get(boolean blocking)
    This method provides synchronous communications (blocking) to retrieve information from a device. The user should load the SnmpPDU with 1 or more parameters before calling this method. This method will make one request for 1 or more objects.
    Returns:
        the int request ID
    See Also:
        addVar, addVar, addVar set
    public int set( )
    This method provides asynchronous communications (non-blocking) to set information on a device. The user should load the SnmpPDU with 1 or more parameters before calling this method. This method will make one request for 1 or more objects.
    Returns:
        the int request ID
    See Also: addVar, addVar, addVar set
    public SnmpPDU set(boolean blocking)
    This method provides synchronous communications (blocking) to set information on a device. The user should load the SnmpPDU with 1 or more parameters before calling this method. This method will make one request for 1 or more objects.
    Returns:
        the int request ID
    See Also:
        addVar, addVar, addVar addVar
    public boolean addVar(String oidArgs)
    This method adds one variable to the SnmpPDU.
    Returns:
        the boolean success state addVar
    public boolean addVar(String oidArgs[ ])
    This method adds one or more variables to the SnmpPDU.
    Returns:
        the boolean success state addVar
    public boolean addVar(String oidArgs, String value, int type)
    This method adds one variable and one value to the SnmpPDU and sets the type of request. This is used to make SNMP sets to a device.
    Returns:
        the boolean success state
    See Also:
        STRING, IPADDRESS, OPAQUE, OBJID, INTEGER, TIMETICKS, COUNTER, GAUGE addVar
   public boolean addVar(String oidArgs[ ], String value[ ], int type[ ])
      This method adds 1 or more variables and 1 or more associated values to the SnmpPDU and sets 1 or more associated types of request. This is used to make SNMP sets to a device.
      Returns:
         the boolean success state
      See Also:
         STRING, IPADDRESS, OPAQUE, OBJID, INTEGER, TIMETICKS, COUNTER, GAUGE
sendPDU
   public SnmpPDU sendPDU( )
      Sends a PDU synchronously (blocking) to a device.
      Returns:
         the Snmp.SnmpPDU variable sent
sendPDU
   public int sendPDU(SnmpPDU pdu)
      Sends a PDU asynchronously (non-blocking) to a device.
      Returns:
         the Snmp.SnmpPDU variable sent
exportMessage
   protected void exportMessage(String message, int level)
      Export user messages to a com.coms.S2.ISDUtils.SDLogger if available or to System.err.println otherwise
debugPrint
   public void debugPrint(String s)
      This debug print method is not currently used.
authenticate
   public boolean authenticate(SnmpPDU pdu, String community)
      This debug print method is not currently used.
callback
   public boolean callback(SnmpSession session, SnmpPDU pdu, int reqid)
      This method should be implemented by the user in the extended class. It should return true if the pdu is processed and false otherwise.
useNetscapeAPI
   public void useNetscapeAPI(boolean useNetscapeAPI)
      This method provides a workaround for security issues for the Netscape browser.
      Parameters:
         useNetscapeAPI—Should be set to true if working in a Netscape browser
sessionStart
   public void sessionStart( )
      This method provides a workaround for security issues for the Netscape browser. This method should be called after setting the SnmpSession parameters.
      See Also:
         initSession
sessionStop
   public void sessionStop( )
      This method shutsdown the SnmpSession.
      See Also
         initSession
apiStop
   public void apiStop( )
      This method shutsdown the SnmpAPI.
      See Also:

initApi
setSnmpApiName
   public void setSnmpApiName(String name)
      This method sets the SnmpAPI name
setSnmpSessionName:
   public void setSnmpSessionName(String name)
      This method sets the SnmpSession name
setLogger
   public void setLogger(SDLogger logger)
      This method hooks the com.coms.S2.ISDUtils.SDLogger into the SnmpRequest.
FIG. 5 shows the association of the SnmpAgent class 20 with respect to the associated JAVA.LANG.OBJECT (JAVA language object) 310. The public class SnmpAgent 20 extends the Object. The components of class SnmpAgent 20 include:
Constructor
   SnmpAgent(String, String, String) The constructor for this class.
   SnmpAgent(String, String, String, String) The constructor for this class.
Method Index
   getcommunity( ) Returns the write community string of the agent
   getIpAddress( ) Returns the IP address of the agent
   getName( ) Returns the name of the agent
   getReadCommunity( ) Returns the read community string of the agent
   getWriteCommunity( ) Returns the write community string of the agent
   setCommunity(String) Sets the write community string of the agent
   setIpAddress(String) Sets the IP address of the agent
   setName(String) Sets the name of the agent
   setReadCommunity(String) Sets the read community string of the agent
   setWriteCommunity(String) Sets the write community string of the agent
Constructors
SnmpAgent
   public SnmpAgent(String agentName, String ipAddress, String community)
      The constructor for this class
      Parameters:
         agentName—The agent name for this agent
         ipAddress—The IP address for this agent
         community—The read/write community string for this agent
SnmpAgent
   public SnmpAgent(String agentName, String ipAddress, String readCommunity, String writeCommunity)
      The constructor for this class
      Parameters:
         agentName—The agent name for this agent
         ipAddress—The IP address for this agent
         readCommunity—The read community string for this agent
         writeCommunity—The write community string for this agent
getName
   public String getName( )
      Returns the name of the agent
      Returns:
         the String name of this agent.
setName:

public void setName(String agentName)
    Sets the name of the agent
getIpAddress:
    public String getIpAddress( )
        Returns the IP address of the agent
    Returns:
        The String IP address of this agent.
setIpAddress
    public void setIpAddress(String ipAddress)
        Sets the IP address of the agent
getCommunity
    public String getcommunity( )
        Returns the write community string of the agent
    Returns:: the String community string of this agent.
setCommunity:
    public void setCommunity(String writeCommunity)
        Sets the write community string of the agent
getReadCommunity
    public String getReadCommunity( )
        Returns the read community string of the agent
    Returns: the String read community string of this agent.
setReadCommunity
    public void setReadCommunity(String readCommunity)
        Sets the read community string of the agent
getWriteCommunity
    public String getWriteCommunity( )
        Returns the write community string of the agent
    Returns:: the String write community string of this agent.
setWriteCommunity
    public void setWriteCommunity(String writeCommunity)
        Sets the write community string of the agent

The System of the Invention

The process of the invention relates to the use of the above classes and more particularly to the extension of the SnmpRequest class to provide multiple variable retrievals and settings within one SnmpRequest. The process includes extending the SnmpRequest class and implementing the Advent SNMP.SNMP client class within the extended class.

The system of the invention is a software JAVA based SNMP (simple network management protocol) library system for use with a management entity and connected devices. The system includes the plurality of classes 212 through 218 which provide descriptions of things that can be accessed. These are inherited by the SnmpVar class 220 which also inherits the SnmpOID class 210. The SNMP application programmer interface (API) or SnmpAPI class 250 provides elements needed for connection. The SnmpSessions class 150 establishes connection between the network management station and connected devices.

The system provides for call back arguments to be received at the network management station from the device. The relationship of the Callback Args class 110 and SnmpCallback 120 is shown in FIG. 1. The SNMP packet data units (PDUs) are formed comprised of one or more object identifiers (OIDs). The OIDs are each packet specific for a particular request. The system extends the SnmpRequest class for extending the API to allow a plurality of objects to be sent or requested in a single PDU. The extended SnmpSessions class 50 is an extension of the SnmpSessions class 150.

The process includes extending the SnmpRequest class and implementing the Advent Snmp.SnmpClient class within the extended class as shown in FIG. 1 at 110. In FIGS. 1 and 2 the dashed lines such as dashed line 110 indicate that the class pointed to (by the closed triangle arrow) is implemented within the attached class. The Advent SnmpClient methods requiring implementation are:
authenticate(SnmpPDU, String)
    This method is used to validate the user authentication with an agent.
callback(SnmpSession, SnmpPDU, int)
    This is the method that will handle the response received. This method should also handle cases of failures or miscommunications with an agent.
debugPrint(String)
    This method is used to print debug messages for the developer or end user.

Within the extended SnmpRequest class 10, one is required to follow a sequence of steps to utilize the SnmpRequest class 10. The steps are as follows:

Initialize the application programmer interface (API) by calling the initApi( . . . ) method. The argument passed into this method is a reference to this class (e.g. the "this" pointer is handed-in as the argument. A section of code may call another section of code and pass in as arguments, one or more variables. This information can be anything defined by the programmer. In this case a reference to the class is something that tells the receiving class something about the calling class. When a reference of a class to another class is passed, the receiving class will know a lot about the calling class and could potentially change a lot of things in the calling class).

After calling the initApi( . . . ) method, one should initialize the packet data unit (PDU) by calling the initPDU( ) method. This method does not require any arguments.

At this point, one needs to instantiate (create) an SnmpAgent object. This is accomplished by handing in the agent name, Internet protocol (IP) address, and a community string to the SnmpAgent constructor of this package. It should be noted that the SnmpAgent can be created at several points within the construction of the extended SnmpRequest class but it must be completed before the call to initSession( ).

Next, the initSession( ) method should called. This will allow communications between the network management station and the end device.

Once the above steps are complete, one can then create object identifier (OID) variables to send to the device. To accomplish this, one would use the addVar methods to add one (1) or more variables to the PDU. Once the variables are added, the packet data unit is sent to the device using the "get( )", "getNext( )" or "set( )" methods (depending upon the request type).

When the packet returns or the system detects a communication failure, the "callback" method noted above would be called by the system and as noted above, the end user is responsible for how the response is handled.

Sample Application package Autodiscovery.classes;

import java.applet.Applet;
import java.util.*;

import Snmp.*; // Advent SNMP package import com.coms.S2.ISDSnmp.*; // 3Com ISD SNMP package based on Advent API

```
/**
 * SystemPoll class constructor.
 */
public class SystemPoll
extends com.coms.S2.ISDSnmp.SnmpRequest
implements Snmp.SnmpClient
{
  // Initialized data
  private static String [ ] validSysObjectID =
  {
  ".1.3.6.1.4.1.114.2.1.1.1.1.9", // BarracudA Rev. 1.1
  ".1.3.6.1.4.1.43.1.16.1.1.1.1" // BarracudA Rev. 1.2+
  };

// SNMP interface
  private String m__SysObjectID = null;
  private String m__SysObjectIdValue = null;
  private boolean m__IsValidSystemId = false;

// SNMP data
  public int m__basicStatus = 0;
  public int m__numVars = 0;
  private long m__requestType;

Snmp.SnmpPDU m__pdu = null;
  Snmp.SnmpPDU m__pduOrig = null; // Keep a copy of
     the original PDU before it gets sent
     // This is used for testing in the GETNEXT case
  // This is a holder for all the PDUs associated with a
     getNext call.
  java.util.Vector m__pduGN = new java.util.Vector( );

SystemPollCallback m__callback = null;

// Construction
  public SystemPoll(SnmpAgent __agent, SystemPollCall-
     back spc)
  {
    super( );

agent = __agent;

m__callback = spc;

// Use the Netscape security API when needed
    if (System.getProperty("java.vendor").toLowerCase(
       ).indexOf("netscape") > = 0 )
    {
      useNetscapeAPI(true);
    }

// Initialize the Advent SNMP API
    super.initApi(this);
    setSnmpApiName("Hot System Poll SnmpAPI");

// Initialize the packet data unit
    initPDU ( );
  } public void Start( )
  {
    // Init the SnmpRequest
    initSession( );

m__SysObjectID = new String(".1.3.6.1.2.1.1.2.0");

addVar(m__SysObjectID);

SetSnmpRequest(Snmp.SnmpAPI.GET__REQ__MSG,
        super.pdu.variables.size( ));
    get( );
  }

/**
 * SetSnmpRequest
 */
private void SetSnmpRequest(long requesttype, int
    numVars)
{
    m__numVars = numVars;
  m__requestType = requesttype;
    m__pduOrig = super.pdu.copy( );
} public          boolean          callback
   (com.coms.S2.ISDSnmp.SnmpSession session, Snmp-
   PDU pdu, int reqid)
{
// If this is an SNMP GetNext request then we need to go
   retrieve more data boolean moreData = false;
   if ( (pdu != null) && (pdu.errstat = =
      com.coms.S2.ISDSnmp.SnmpStatus.SnmpNoError)
   )
   {
   // Make a copy of this pdu
   m__pdu = pdu.copy( );
   // Print out the contents of the PDU
   if (DEBUG__LEVEL = = 1)
   {
      System. out. println("start--------------------
         CFBSnmpSession callback----------------------
         --start");
      System.out.println("Request Id (" +reqid + ") Error
         index ("+pdu.errindex + ") with
varbinds:");
      System.out.println(pdu.printVarBinds( ));
      System.out.println("stop---------------------
         CFBSnmpSession callback----------------------
         --stop");
   }

// Check the PDU for proper sequencing boolean valid-
      Pdu = this.isinSubTree(pdu);

// Process the PDU based upon the data returned and
      some preprocessing
   if ( (pdu != null) && (pdu.errstat = =
com.coms.S2.ISDSnmp.SnmpStatus.SnmpNoError) )
   {
   m__basicStatus = pdu.errstat;

String string__val = null;
   long long__val = 0;
   long ticks = 0;
   Snmp.SnmpVarBind varbindRx;
   Snmp.SnmpVarBind varbindTx;
```

```
for (Enumeration vrx = pdu.variables.elements( ), //
    received PDU variables
    vsx = m_pduOrig.variables.elements( ); // Original
      PDU variables sent in all cases
    vrx.hasMoreElements( ) && vsx.hasMoreElements(
      ) ; )
{
  Object obj = vrx.nextElement( );
  varbindRx = (Snmp.SnmpVarBind)obj;
  varbindTx = (Snmp.SnmpVarBind)vsx. nextElement(
    );

String oidStr = varbindRx.oid.toString( );
  String oidSentStr = varbindTx.oid.toString( );
  String oidStrStrip = " ";
  if (oidStr.length( ) > = oidSentStr.length( ))
  {
    oidStrStrip = oidStr.substring(0, oidSentStr.length(
      ));
  } string_val = varbindRx.variable.toString( );

switch (varbindRx.variable.Type)
  {
  case SnmpAPI.INTEGER:
  {
    //System.out.println("SystemPoll.callback( ): INTE-
      GER = " +string_val);
  }
  break;

case SnmpAPI.STRING:
  {
    //System.out.println("SystemPoll.callback( ):
      STRING = " +string_val);
  }
  break;
  case SnmpAPI.OBJID:
  {
    m_SysObjectIdValue = string_val;
    //System.out.println("SystemPoll.callback: OBJID =
      " +string_val);
  }
  break;

case SnmpAPI.NULLOBJ:
  {
    //System.out.println("SystemPoll.callback:
      NULLOBJ = " +string_val);
  }
  break;

case SnmpAPI.IPADDRESS:
  {
    //System.out.println("SystemPoll.callback: IPAD-
      DRESS = " +string_val);
  }
  break;

case SnmpAPI.COUNTER:
  {
    //System.out.println("SystemPoll.callback:
      COUNTER = " +string_val);
  }
  break;

case SnmpAPI.GAUGE:
  {
    //System.out.println("SystemPoll.callback: GAUGE
      = " +string_val);
  }
  break;

case SnmpAPI.TIMETICKS:
  {
    //System.out.println("SystemPoll.callback: TIMET-
      ICKS = " +string_val);
  }
  break;

case SnmpAPI.OPAQUE:
  {
    //System out.println("SystemPoll.callback:
      OPAQUE = " +string_val);
  }
  break;

default:
  {
    //System.out.println("SystemPoll.callback: default =
      " +string_val);
  }
  break;
  } // end of switch statement // Check to see if this is a GET or SET request. If it is then
  // there is no further data to come so just shove the
  // returned data into the data holder
  if ( m_requestType = = Snmp.SnmpAPI.GET_REQ_
    MSG ||
    m_requestType = = Snmp.SnmpAPI.SET_REQ_
      MSG)
  {
    m_pduGN.addElement(obj); // Copy the data into the
      holder
  }
  // If this was a GETNEXT request and the data returned
  // is still along the same branch (i.e. there is more
  // data to retrieve) append the data and get the rest
  else    if    (    m_requestType    =    =
    Snmp.SnmpAPl.GETNEXT_REQ_MSG && valid-
    Pdu )
  {
    moreData = true; // this must be a GETNEXT with
      valid data
    m_pduGN.addElement(obj); // Copy the data into the
      holder
  }
  else
  {
    moreData = false;
  }
} // end of varbind for loop
if (moreData && (m_requestType = =
  Snmp.SnmpAPI.GETNEXT_REQ_MSG) )
{
  // Clear the pdu
  super.initPDU( );
```

```
for (Enumeration vrx = pdu.variables.elements( );
   vrx.hasMoreElements( ); )
{
  varbindRx    =    (Snmp.SnmpVarBind)
     vrx.nextElement( );
  String oidStr = varbindRx.oid.toString( );
     addVar(oidStr);
} // end of varbind for loop // This was a GETNEXT so issue another request
// for the remaining information
getNext( );
}
else
{
  m_pdu.variables = (Vector)m_pduGN.clone( );
  // Clear the holder of getNext data
  m_pduGN.removeAllElements( );
// Pass this through the state machine
if (m_callback != null)
{
  m_IsValidSystemId = false;

for (int id = 0; id < validSysObjectID.length; id + +)
  {
    System.out.println("Compare:           "
       +agent.getIpAddress( ) +" " +validSysObjectID
       [id]
       + " " +m_SysObjectIdValue);
    int val = validSysObjectID[id].compareTo(m_
       SysObjectIdValue);
    if (val = = 0)
    {
       m_IsValidSystemId = true;

System.out.println("Valid  SysObjectID"
          +m_SysObjectIdValue);

break; // break out if we hit one before the end of
          the list
    }
  }
    if (m_IsValidSystemId = = false)
    {
    System.out.println("Invalid  SysObjectID"
       +agent.getIpAddress( ) + "::"
       +m_SysObjectIdValue);
    }
    m_callback.SysPollCallback
       (com.coms.S2.ISDSnmp.SnmpStatus.SnmpNoError,
       m_IsValidSystemId, agent.getIpAddress( ));
    }
  }
} // end if
} // if
else if ( (pdu != null) && (pdu.errstat = =
com.coms.S2.ISDSnmp.SnmpStatus.SnmpTimeOut))
{
  m_basicStatus                           =
     com.coms.S2.ISDSnmp.SnmpStatus.SnmpTimeOut;
  if (m_callback != null)
  {
    m_callback.SysPollCallback(m_basicStatus, false,
       (String)null);
  }
}
else
{
  if ((pdu != null) && (pdu.errstat != 0))
  {
    m_basicStatus = pdu.errstat;
    if (DEBUG_LEVEL > = 1)
    {
       System.out.println("CFBSnmpSession  Error
          Indication in response: "
       +Snmp.SnmpException.exceptionString((byte)
          pdu.errstat) + "\nErrindex: " +
       pdu.errindex);
    } if (m_callback != null)
    {
       m_callback.SysPollCallback(m_basicStatus, false,
          (String)null);
    }
  }
  else if (pdu = = null)
  {
    if (m_callback != null)
    {
       m_callback.SysPollCallback
          (com.coms.S2.ISDSnmp.SnmpStatus.SnmpGenErr,
          false, (String)null);
    }
  }
}
FreeResources( );

return true;

} void FreeResources( )
{
  if ( System.getProperty("java.vendor").toLowerCase(
     ).indexOf("netscape") > = 0 )
  {
  // Attempt to enable required privileges
  try
  {
    netscape.security.PrivilegeManager.enablePrivilege
       ("Netcaster");
  }
  catch (netscape.security.ForbiddenTargetException e)
  {
    System.out.println("Unable  to  set  Netscape
       permissions!");
  }
  catch (Exception e)
  {
    System.out.println("Exception  generated  setting
       Netscape permissions!");
  }
}
// Purge the SnmpRequest PDU
super.initPDU( );
// Null out the copy of the returned PDU
  m_pdu = null;
} public void debugPrint(String s)
```

```
    System.out.println(s);
} public String GetSystemObjectID( )
{
    return m__SysObjectIdValue;
}
public boolean GetValidity( )
{
    return m__IsValidSystemId;
}
public void RegisterCallback(SystemPollCallback spc)
{
    this.m__callback = spc;
    }
}
```

Various other applications may be provided with the system of the invention and following the process of the invention. The system and process of the invention provide the significant advantage of allowing multiple object identifiers to be retrieved and set via on SNMP Request but still using a JAVA based SNMP Library and particularly using the Advent Net library as a base.

While specific embodiments of the invention have been shown and described in detail to illustrate the application of the principles of the invention, it will be understood that the invention may be embodied otherwise without departing from such principles.

What is claimed is:

1. A method for forming packet data units with object identifiers (OIDs), the OIDs being packet specific for a particular request in an object management system using SNMP (simple network management protocol) attributes, the object management system including a plurality of objects and procedures for accessing the objects, the object management system being accessible over a network and associated with a network-attached device, the method comprising the steps of:
   providing the object management system with a plurality of classes providing descriptions of things that can be accessed, a SnmpSessions class establishing connection between the object management system and connected devices, call back arguments received at the network management station from the device and a SNMP application programmer interface (API) providing elements needed for connection;
   extending a SnmpRequest class for extending the API to allow a plurality of objects to be sent or retrieved in a same single packet data unit (PDU) to reduce network traffic; and
   forming a SNMP packet data unit (PDU) comprised of a plurality of object identifiers (OIDs), the OIDs being packet specific for a particular request.

2. The method according to claim 1, wherein the provided object management system has an Advent Snmp.SnmpClient class, said Advent Snmp.SnmpClient class being implemented within the extended SnmpRequest class.

3. The method according to claim 2, further comprising the steps of implementing an Advent SnmpClient method authenticate(SnmpPDU, String) to validate the user authentication with an agent.

4. The method according to claim 2, further comprising the steps of implementing an Advent SnmpClient method callback(SnmpSession, SnmpPDU, int) to handle a response received and/or to handle cases of failures or miscommunications with an agent.

5. The method according to claim 2, further comprising the steps of implementing an Advent SnmpClient methoddebugPrint(String) to print debug messages for the developer or end users.

6. The method according to claim 1, further comprising providing an SnmpAgent class which extends the object.

7. The method according to claim 6, further comprising the steps of within the extended SnmpRequest class:
   initializing the application programmer interface (API) by calling an initApi( . . . ) method wherein the argument passed into this method is a reference to this class;
   subsequent to calling the initApi( . . . ) method, initializing the packet data unit (PDU) by calling a initPDU( ) method;
   instantiating an SnmpAgent object by handing in the agent name, internet protocol (IP) address, and a community string to a SnmpAgent constructor of the SnmpAgent class; and
   calling an initSession( ) method of the SnmpRequest class to allow communications between the network management station and the end device.

8. The method according to claim 7, further comprising the steps of:
   creating object identifier (OID) variables to send to the device by using a addVar method of the SnmpRequest class to add one or more variables to the PDU.

9. The method according to claim 8, further comprising the steps of:
   subsequent to adding variables, sending the packet data unit to the device using a get( ), getNext, or "set( )" method (depending upon the request type) of the SnmpRequest class.

10. The method according to claim 9, further comprising the steps of:
    subsequent to sending the packet data unit to the device and upon the packet returning or the system detecting a communication failure, a callback met hod of the SnmpRequest class is called.

11. The method according to claim 7, wherein the initPDU( ) method does not require any arguments.

12. The method according to claim 7, wherein the SnmpAgent can be created at several points within the construction of the extended SnmpRequest class but must be completed before the call to initSession( ).

13. A software JAVA based SNMP (simple network management protocol) library system for use with a management entity and connected devices, the system comprising;
   a plurality of classes providing descriptions of things that can be accessed;
   a SNMP application programmer interface (API) providing elements needed for connection;
   a SnmpSessions class establishing connection between the network management station and connected devices;
   call back arguments received at the network management station from the device;
   a SNMP packet data unit (PDU) comprised of a plurality of object identifiers (OIDs), the OIDs being packet specific for a particular request; and
   SnmpRequest class for extending the API to allow a plurality of objects to be sent or retrieved in a same single PDU to reduce network traffic.

14. The system according to claim 13, further comprising and extended SnmpSessions class inheriting from said SnmpSession class, said extended SnmpSessions class being associated with said SnmpRequest class.

15. The system according to claim 13, further comprising: an Advent SNMP SnmpClient class implemented within the extended SnmpRequest class.

16. The system according to claim 14, wherein the SnmpClient class includes the methods authenticate(SnmpPDU, String) to validate the user authentication with an agent and callback(SnmpSession, SnmpPDU, int) to handle the response received and/or failures or miscommunications with an agent, which methods are implemented within the extended SnmpRequest class.

17. The system according to claim 13, further comprising an SnmpAgent class which extends the object.

18. The system according to claim 13, further comprising:

an initApi( . . . ) method, within the extended SnmpRequest class, the initApi( . . . ) method initializing the application programmer interface (API) wherein the argument passed into this method is a reference to this class;

an initPDU( ) method, within the extended SnmpRequest class, the initPDU( ) method initializing the packet data unit (PDU) subsequent to calling the initApi( . . . ) method;

a SnmpAgent constructor of the SnmpAgent class, the SnmpAgent constructor instantiating an SnmpAgent object;

an initSession( ) method of the SnmpRequest class to allow communications between the network management station and the end device.

19. The system according to claim 18 further comprising:

object identifier (OID) variables to send to the device by using a addVar method of the SnmpRequest class to add one or more variables to the PDU;

a get( ), getNext, or "set( )" method of the SnmpRequest class used subsequent to adding variables for sending the packet data unit to the device; and a callback method of the SnmpRequest class which is called subsequent to sending the packet data unit to the device and upon the packet returning or the system detecting a communication failure.

20. The system according to claim 13 wherein said SnmpRequest class includes variables, methods and constructors and said plurality of classes providing descriptions of things that can be accessed, providing a way to categorize data and also providing methods to extract information about the various data types into a particular format.

* * * * *